(12) United States Patent
Hollander et al.

(10) Patent No.: US 8,110,803 B2
(45) Date of Patent: Feb. 7, 2012

(54) SIGHTING SYSTEM AND METHOD

(75) Inventors: Milton Bernard Hollander, Stamford, CT (US); Shahin Baghai, Trumbull, CT (US)

(73) Assignee: White Box, Inc., Stamford, CT (US)

( * ) Notice: Subject to any disclaimer, the term of this patent is extended or adjusted under 35 U.S.C. 154(b) by 270 days.

(21) Appl. No.: 12/387,630

(22) Filed: May 5, 2009

(65) Prior Publication Data

US 2009/0238237 A1 Sep. 24, 2009

Related U.S. Application Data

(63) Continuation-in-part of application No. 11/000,868, filed on Dec. 1, 2004, now Pat. No. 7,611,278, and a continuation-in-part of application No. 11/259,830, filed on Oct. 27, 2005, now Pat. No. 7,537,381, and a continuation-in-part of application No. 11/513,954, filed on Aug. 31, 2006, now Pat. No. 7,550,725.

(51) Int. Cl.
*G01J 5/00* (2006.01)

(52) U.S. Cl. .......... 250/338.1; 374/120; 374/121
(58) Field of Classification Search .......... 250/330, 250/338.1, 339.14; 374/120, 121
See application file for complete search history.

(56) References Cited

U.S. PATENT DOCUMENTS

| | | | | |
|---|---|---|---|---|
| 4,343,182 A * | 8/1982 | Pompei | | 374/31 |
| 6,280,082 B1 * | 8/2001 | Aoyama et al. | | 374/121 |
| 2004/0196888 A1 * | 10/2004 | Musbach et al. | | 374/120 |

* cited by examiner

*Primary Examiner* — Mark R Gaworecki
(74) *Attorney, Agent, or Firm* — William A. Drucker

(57) ABSTRACT

This invention relates to optical sighting apparatus systems, and to methods for visualization and for identifying remote target surface areas without physical contact for the purpose of measurement and/or of treatment of the remote surface. An arrangement of projected light beams indicates the position and size of the target surface in relation to a measurement detector or treatment device, so that the device is accurately directed to the target. In a preferred arrangement separate laser beams form a light distribution indication or brightness pattern at the target and the device is sighted toward the pattern on the target surface area.

7 Claims, 2 Drawing Sheets

– FUNCTIONAL BLOCK DIAGRAM OF AN INFRARED THERMOMETER
WITH SINGLE LASER EMITTER, RANGE FINDER, NIGHT VISION & SPEECH CAPABILITY

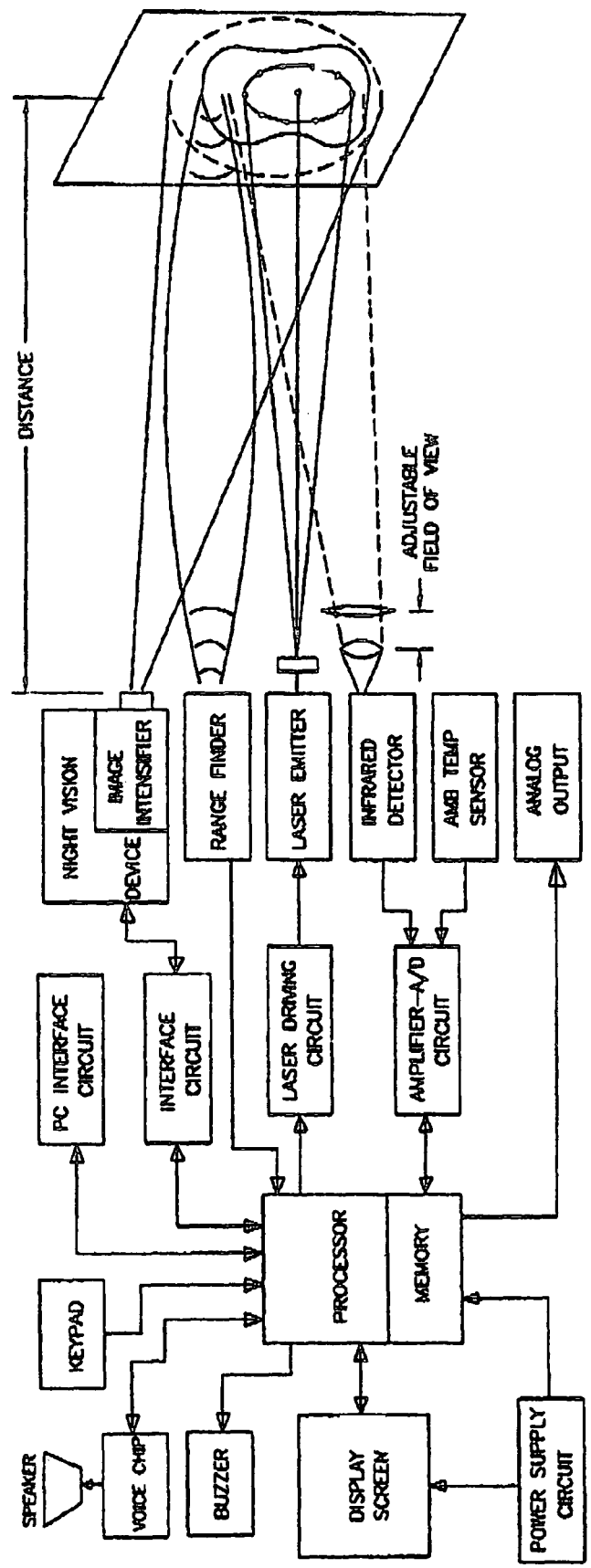
FIG 1 – FUNCTIONAL BLOCK DIAGRAM OF AN INFRARED THERMOMETER WITH SINGLE LASER EMITTER, RANGE FINDER, NIGHT VISION & SPEECH CAPABILITY

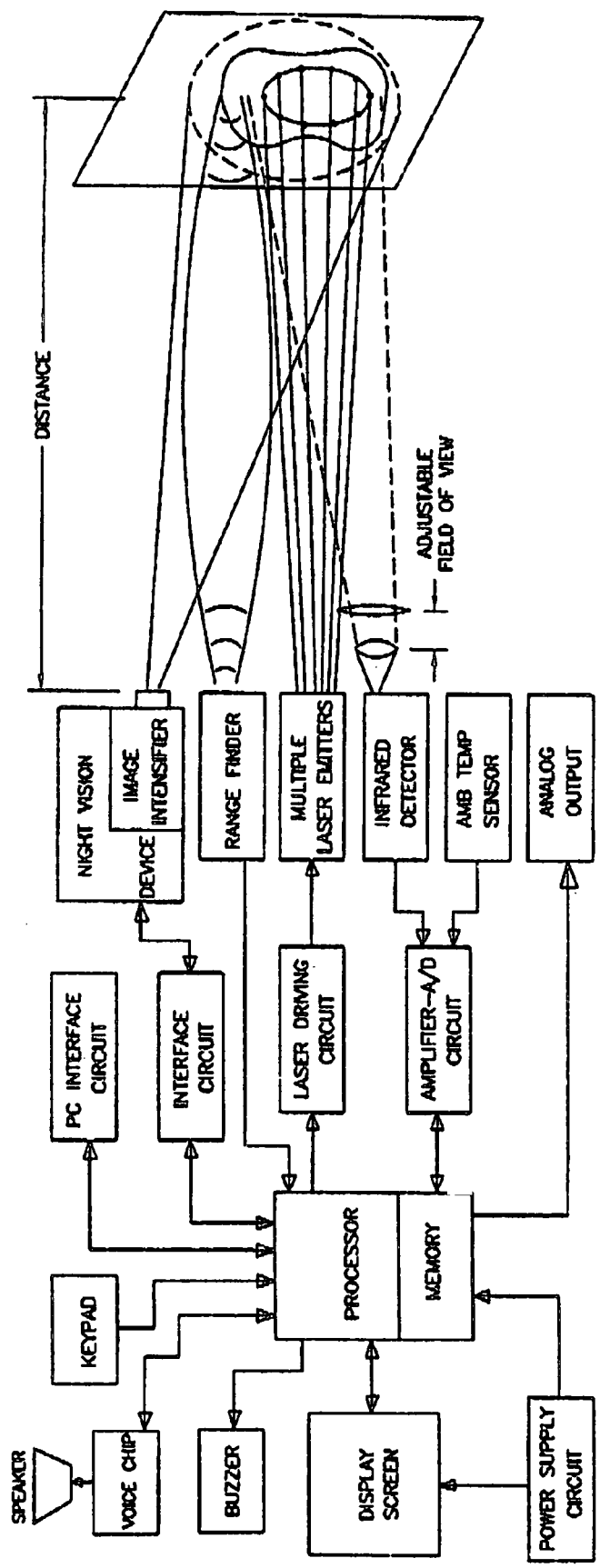
FIG 2 – FUNCTIONAL BLOCK DIAGRAM OF AN INFRARED THERMOMETER WITH MULTIPLE LASER EMITTERS, RANGE FINDER, NIGHT VISION & SPEECH CAPABILITY

SIGHTING SYSTEM AND METHOD

This application is a continuation-in-part of the following co-pending applications of the same inventors; and the entire contents thereof are incorporated herein by reference.

This application is a continuation-in-part of U.S. application Ser. No. 11/000,868 filed Dec. 1, 2004 now U.S. Pat. No. 7,611,278; and of U.S. Ser. No. 11/259,830 filed Oct. 27, 2005 now U.S. Pat. No. 7,537,381; and of U.S. Ser. No. 11/513,954 filed Aug. 31, 2006 now U.S. Pat. No. 7,550,725. The application claims priority filing date rights from each U.S.A. provisional application mentioned in these pending cases.

The invention relates to visualization of remote surfaces by visible light projected thereupon to form a sighting pattern or display, which indicates the surface area of investigation or treatment, such as in measurement of surface temperature.

In practice a distant surface is visualized by forming thereupon a pattern of visible light as a display at the target area. The measurement or treatment device is directed to the pattern. When the target area emits invisible radiation, e.g., infrared, the emission area is visualized by additional projected visible light, which forms a sighting display pattern on the surface whereby the display may conveniently serve to outline, identify and locate the target. The sighting display produced in this invention is usefully contrived to indicate the size or scale of measurement values derived from measurements of a testing device generating the display. For example values appear within or near a circular or box display on a measurement surface and include a number of separate visible characters or symbols, such as numbers or letters which instantly advise the user of a test result, such as measured surface temperature at the display. The characters are formed by light passing through a diffraction grating lens in a known manner. Pulsation of the display is regulated to indicate the measurement result, either as a whole or by selection of individual symbols, which convey a simple coded indication of the results.

When using projected visible light beams to mark a target surface area at a distance, it is important that at the working distance between each sighting light generator and the target area, the light reflected from the surface must be bright enough to be seen by the system operator, and yet must be of a brightness safe enough to avoid eye damage and must comply with industrial safety regulations. The safety regulations apply separately to each individual light source. Use of separate or multiple sources implies the possibility of multiplication of the illuminating power of a single source. Therefore multiple separate beams allow working at a greater range than use of a single limited power beam.

Apparent visibility of a beam marking pattern on a remote surface is enhanced by beam power pulsation, as well as by different numbers of separate marker beams. Pulsation may alternate or operate sequentially. It may give an impression of a moving light pattern of flashing or progressive movement. Pulsing light may vary in color, hue or speed to indicate system status.

Persistence of vision is a recognized feature of motion picture display and is used with marker beam pulsation to create an image effect of merging separate beam displays to imply a continuous unbroken line of light in a pattern.

In a preferred best version of the invention, at least three separate light beam sources are sequentially switched on or pulsed to form a circle pattern of visible spots about one hundred twenty degrees apart at the edge of a circle. One or more lights operate at a time. Pulsation creates the impression of a continuous light outline circle from separate spots by virtue of retinal persistence. The switching system allows total black out intervals, or selection at any time of one or more flashing lights.

In one pulsing example, each of three beams is alternately illuminated, e.g., for one sixteenth of a second, so that three or more spots appear to the human eye illuminated together. This feature is similar to looking at a movie, where each frame is illuminated for one sixteenth of a second, and the viewer see sixteen frames in one second, but the human eye does not individually detect each frame separately. Alternation of the light beam pulse does not have to be at precisely sixteen frames per second. Faster or slower pulsation will also give the impression of the display being constantly switched on.

Marker sighting light for this invention is, for example, generated from high intensity stroboscopic or halogen lamps and preferably from a laser diode source. It is displayed directly on a remote surface or is directed thereto by an optical element such as a lens or prism or mirror. A preferred construction of an optical element embodies a diffraction beam splitter lens used with at least one light source, which produces separate beams from a single light source to produce a light distribution marking pattern. An alternative construction embodies separate light sources, which operate together or apart, and may be pulsed to enhance visibility of the marker pattern display.

EXAMPLE

In a preferred application of this invention a hand held optical thermometer is directed at a visible light pattern on a remote surface, to identify the area of infrared emission for measurement of an energy zone, and to detect the temperature of the surface supporting the display.

DRAWING

The DRAWING shows an arrangement of features of the invention wherein separate marking light sources are controlled by switch means, arranged and set to pulsate, for example, on and off, in a sequence to display on a monitor display and/or on a remote test target surface a pattern of light distribution marking spots which pattern implies the outline of a selectable test target area for the sighting or aiming of a device of the invention.

FIG. ONE is a functional block diagram of an infrared thermometer with a single laser emitter, range finder, night vision and speech/buzzer capability.

FIG. TWO is a functional block diagram of an infrared thermometer with separate laser emitters, range finder, night vision and speech capability.

FEATURES

It is a feature of this invention that a range finder operates in combination with a microprocessor having a program and a memory, which contains optical-focus data charts. The processor is built into or interfaced with the instrument construction. Marker light is activated by the processor to produce an ideal marker image display pattern of optimal visibility by regulation of light source brightness (number of lamps or voltage to each lamp), pulse frequency, or focus (when variable) according to range finder indicated distance.

It is another feature of the invention that low vision light detection means, such as a photo multiplier cell or image intensifier, is integral to the device construction or is an external plug-in accessory which is interfaced to and linked to the microprocessor, which adjusts the brightness and the visibility of the display on the target surface and also on an instrument monitor screen display, according to target distance, determined by the range finder, so that safe useful display brightness is maintained in variable conditions, such as long range operation. This low vision circuit thereby also manages the pulsation activity and the marker light display brightness.

The system of the invention is arranged to operate so that the image of the target on a detector, for example, is at a fixed focus of infinity and/or in an alternate arrangement of the sighting system, wherein the focus of the device on the target is variable between a near or close focus sighting arrangement and a far focus sighting arrangement. This can be managed manually, or one can change or select the focus and the field of view of the device automatically, such as via control by the processor system linked to the range finder feature. Variable focus arrangement is best operated with a plurality of separate light generators, preferably as separate laser diodes.

Another feature of the invention is a voice chip and/or a buzzer alarm system controlled by the processor. The chip announces measured temperature, time or duration, distance, warnings and related parameters. The buzzer emits a continuous or pulsed sound indicating change of temperature, for example. Higher temperature provokes louder sound or higher pitch. The buzzer is programmed to sound when the device locks onto or detects a hot spot or cold spot.

Methods

In one method of the invention separate marking light generators are selectably switched on to produce a light distribution pattern on a remote measurement or treatment surface, to generate a visible light pattern against which a device is directed to collect information or to manage surface treatment. The pattern visibility is enhanced by pulsating of the marking light according to target distance from the device as measured by a range finder. A processor component of the system controls the visibility of the display of marking light via a processor and a photo multiplier circuit. In a preferred or best mode method surface temperature is remotely measured without physical device contact of a measurement surface by forming a visible light display on the surface and directing an infrared radiometer at a visible sighting or aiming pattern on the surface. Surface treatment methods may include welding, drilling, machining, cutting, melting or local chemical activation. Collected information may include temperature, viscosity, softening, distortion, stretching, coloration or structural changes.

The invention claimed is:

1. A system for remote surface visualization comprising:
separate aiming lights each directed to a remote surface to form there upon a visible light distribution display pattern for sighting a measurement or treatment device to test, measure, or manage an identified surface area;
means to control visibility of the pattern according to measured distance between the lights and the surface pattern; and
a range finder operating in combination with a micro processor, having a program and a memory, which includes optical-focus data charts, whereby pattern light from separate aiming lights is activated by said processor to produce a pattern of optimal visibility according to range finder indicated distance, both at a close position and at a far position.

2. A method of visualization of a remote surface for aiming the system of claim 1 at a selected area, comprising directing separate aiming maker display light sources to produce a light aiming display pattern on said surface and adjusting the visibility of the display pattern according to the measured distance between the system and the display pattern.

3. Method of claim 2 for aiming an instrument to identify and to visualize a remote target surface area without contact and to provide instrumental measurement or treatment of the identified area comprising:
  a) directing visible variable focus light sighting means from said instrument onto said area, which means is arranged to form an identifiable visible instrument aiming pattern on said surface at a close position and at a far position;
  b) directing said instrument and said sighting means to capture, focus and embrace an image of said pattern from said area with sighting means of said instrument; and
  c) providing measurement or treatment of said area by said instrument.

4. Method of claim 3 in which said sighting means comprises separate light sources.

5. Method of claim 3 in which at least one of said light sources is a laser.

6. Method of claim 3 in which said instrument measures infrared radiation from said surface to indicate the temperature thereof.

7. Apparatus for aiming a device at a remote surface area as in the system of claim 1 comprising separate marker display lights, means to pulsate the lights, means to measure distance between the lights and the surface area and means to detect and to regulate the visibility of the display.

* * * * *